US012323495B2

(12) United States Patent
Lee et al.

(10) Patent No.: US 12,323,495 B2
(45) Date of Patent: Jun. 3, 2025

(54) APPARATUS AND METHOD FOR SUPPORTING EDGE COMPUTING SERVICE IN WIRELESS COMMUNICATION SYSTEM (71) Applicant: Samsung Electronics Co., Ltd., Gyeonggi-do (KR)

(72) Inventors: Jicheol Lee, Gyeonggi-do (KR); Sunghoon Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 309 days.

(21) Appl. No.: 17/791,653

(22) PCT Filed: Jan. 8, 2021

(86) PCT No.: PCT/KR2021/000256
§ 371 (c)(1),
(2) Date: Jul. 8, 2022

(87) PCT Pub. No.: WO2021/141440
PCT Pub. Date: Jul. 15, 2021

(65) Prior Publication Data
US 2023/0032185 A1    Feb. 2, 2023

(30) Foreign Application Priority Data
Jan. 8, 2020  (KR) ........................ 10-2020-0002819

(51) Int. Cl.
*H04L 67/51* (2022.01)
*H04L 41/0894* (2022.01)
(Continued)

(52) U.S. Cl.
CPC .............. *H04L 67/51* (2022.05); *H04L 67/10* (2013.01); *H04W 8/20* (2013.01); *H04W 60/00* (2013.01); *H04L 41/0894* (2022.05); *H04W 88/18* (2013.01)

(58) Field of Classification Search
CPC ....... H04W 8/20; H04W 60/00; H04W 88/18; H04W 8/00; H04L 67/51; H04L 61/4511;
(Continued)

(56) References Cited

U.S. PATENT DOCUMENTS

2017/0303259 A1* 10/2017 Lee ........................ H04W 28/16
2019/0037407 A1* 1/2019 Nair ......................... H04L 9/14
(Continued)

FOREIGN PATENT DOCUMENTS

KR   10-2021-0055537    5/2021

OTHER PUBLICATIONS

European Search Report dated May 3, 2024 issued in counterpart application No. 21738510.3-1206, 8 pages.
(Continued)

*Primary Examiner* — Santiago Garcia
(74) *Attorney, Agent, or Firm* — The Farrell Law Firm, P.C.

(57) ABSTRACT

The present disclosure relates to a 5th generation (5G) or pre-5G communication system for supporting a higher data transmission rate after a 4th generation (4G) communication system such as long-term evolution (LTE). According to various embodiments of the present disclosure, in an operating method of a first network node in a wireless communication system, provided is a method including transmitting a network function (NF) registration request message including profile information of a service supported by the first network node to a second network node, and receiving an NF registration response message including a registration result of the profile information from the second network node.

16 Claims, 6 Drawing Sheets (51) Int. Cl.
  *H04L 67/10* (2022.01)
  *H04W 8/20* (2009.01)
  *H04W 60/00* (2009.01)
  *H04W 88/18* (2009.01)

(58) Field of Classification Search
  CPC ............ H04L 41/0806; H04L 41/0894; H04L 41/5009; H04L 43/028; H04L 43/0858; H04L 43/16; H04L 61/5076; H04L 67/53; H04L 2101/69; H04L 65/1073; H04L 67/10; H04L 67/30
  See application file for complete search history.

(56) References Cited

U.S. PATENT DOCUMENTS

| | | | | |
|---|---|---|---|---|
| 2019/0230556 | A1* | 7/2019 | Lee | H04W 28/16 |
| 2019/0380104 | A1* | 12/2019 | Vrzic | H04W 48/18 |
| 2021/0144063 | A1* | 5/2021 | Abboud | H04W 48/18 |
| 2021/0385777 | A1* | 12/2021 | Son | H04W 48/18 |
| 2022/0015181 | A1* | 1/2022 | Rönneke | H04W 76/27 |
| 2022/0030538 | A1* | 1/2022 | Tiwari | H04W 60/005 |
| 2022/0039046 | A1* | 2/2022 | Ianev | H04W 60/00 |
| 2022/0053478 | A1* | 2/2022 | Xu | H04W 4/40 |
| 2022/0124065 | A1* | 4/2022 | Dao | H04L 61/5007 |
| 2022/0124869 | A1* | 4/2022 | Keller | H04W 4/90 |
| 2022/0225448 | A1* | 7/2022 | Li | H04W 60/04 |
| 2022/0240222 | A1* | 7/2022 | Youn | H04W 60/005 |
| 2023/0164880 | A1* | 5/2023 | Tiwari | H04L 65/1073 455/404.1 |
| 2024/0137756 | A1* | 4/2024 | Tiwari | H04W 12/0431 |

OTHER PUBLICATIONS

PCT/ISA/210 Search Report issued on PCT/KR2021/000256, Apr. 22, 2021 pp. 6.
PCT/ISA/237 Written Opinion issued on PCT/KR2021/000256, Aor. 22, 2021, pp. 8.
3GPP TS 23.502 V16.3.0 (Dec. 2019), Technical Specification, 3rd Generation Partnership Project; Technical Specification Group Services and System Aspects; Procedures for the 5G System (5GS); Stage 2 (Release 16), pp. 547.
3GPP TSG-SA WG2 Meeting #135 S2-1908828, Split, Croatia, Oct. 11-18, 2019, "Add supported DNAI in UPF profile", pp. 2.
3GPP TS 23.501 V16.3.0 (Dec. 2019), Technical Specification, 3rd Generation Partnership Project; Technical Specification Group Services and System Aspects; System architecture for the 5G System (5GS); Stage 2 (Release 16), pp. 410.
3GPP TS 29.510 V16.2.0 (Dec. 2019), Technical Specification, 3rd Generation Partnership Project; Technical Specification Group Core Network and Terminals; 5G System; Network Function Repository Services; Stage 3 (Release 16), pp. 164.
China Mobile, "Local Network Exposure with LLMF", S2-1812083, SA WG2 Meeting #129bis, Nov. 26-30, 2018, 6 pages.
European Search Report dated Jan. 9, 2023 issued in counterpart application No. 21738510.3-1213, 14 pages.
3GPP TS 23.502 V16.2.0, (Sep. 2019), pp. 524.
3GPP Ts 23.501 V15.6.0, (Jun. 2019), pp. 243.
Korean Office Action dated Jan. 14, 2025 issued in counterpart application No. 10-2020-0002819, 11 pages.

* cited by examiner

APPARATUS AND METHOD FOR SUPPORTING EDGE COMPUTING SERVICE IN WIRELESS COMMUNICATION SYSTEM

PRIORITY

This application is a National Phase Entry of PCT International Application No. PCT/KR2021/000256, which was filed on Jan. 8, 2021, and claims priority to Korean Patent Application No. 10-2020-0002819, which was filed on Jan. 8, 2020, the entire content of each of which is incorporated herein by reference.

TECHNICAL FIELD

The present disclosure relates generally to a wireless communication system, and more particularly, to an apparatus and a method for supporting an edge computing service in the wireless communication system.

BACKGROUND ART

To satisfy a wireless data traffic demand which is growing after a $4^{th}$ generation (4G) communication system is commercialized, efforts are exerted to develop an advanced $5^{th}$ generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is developing hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

The 5G communication system is considering support for various services compared to the existing 4G communication system. For example, the 5G communication system may support enhanced mobile broad band (eMBB), ultra-reliable and low latency communication (URLLC), massive machine type communication (mMTC), evolved multimedia broadcast/multicast service (eMBMS), and the like.

DISCLOSURE OF INVENTION

Technical Problem

Based on the discussions described above, the present disclosure provides an apparatus and a method for supporting edge computing in a wireless communication system.

Solution to Problem

According to various embodiments of the present disclosure, an operating method of a first network node in a wireless communication system is provided. The method includes transmitting a network function (NF) registration request message including profile information of a service supported by the first network node to a second network node, and receiving an NF registration response message including a registration result of the profile information from the second network node.

According to various embodiments of the present disclosure, a first network node in a wireless communication system is provided. The network node includes at least one transceiver, and at least one processor, and the at least one processor is configured to transmit an NF registration request message including profile information of a service supported by the first network node to a second network node, and receive an NF registration response message including a registration result of the profile information from the second network node.

Advantageous Effects of Invention

An apparatus and a method according to various embodiments of the present disclosure, may provide an apparatus and a method for supporting edge computing in a wireless communication system.

Effects obtainable from the present disclosure are not limited to the above-mentioned effects, and other effects which are not mentioned may be clearly understood by those skilled in the art of the present disclosure through the following descriptions.

BEST MODE FOR CARRYING OUT THE INVENTION

Terms used in the present disclosure are used merely to describe specific embodiments, and may not intend to limit the scope of other embodiments. Singular expressions may include plural expressions unless the context clearly indicates otherwise. Terms used herein, including technical or scientific terms, may have the same meaning as those commonly understood by a person of ordinary skill in the technical field described in the present disclosure. Among the terms used in the present disclosure, terms defined in a general dictionary may be interpreted as having the same or similar meaning as those in the context of the related art, and unless explicitly defined in the present disclosure, may not be interpreted as ideal or excessively formal meanings. In some cases, even terms defined in the present disclosure may not be interpreted to exclude embodiments of the present disclosure.

A hardware-based approach will be described as an example in various embodiments of the present disclosure to be described hereafter. However, various embodiments of the present include technology which uses both hardware and software, and accordingly various embodiments of the present disclosure do not exclude a software-based approach.

Terms indicating signals, terms indicating channels, terms indicating control information, terms indicating network entities, and terms indicating components of a device used in the following explanation are illustrated for convenience of description. Accordingly, the present disclosure is not limited to the terms to be described, and other terms having the same technical meanings may be used.

Terms for identifying access nodes, terms indicating network entities or network functions (NFs), terms indicating messages, terms indicating interfaces between network entities, and terms indicating various identification information used in the following explanation are illustrated for convenience of description. Accordingly, the present disclosure is not limited to the terms to be described, and other terms indicating entities having the same technical meanings may be used.

Hereafter, the present invention uses terms and names defined in 3rd generation partnership project long term evolution (3GPP LTE) and 5th generation (5G) standards for the convenience of description. However, the present invention is not limited by the terms and names, and may be applied to a system conforming to other standard.

Hereafter, for convenience of explanation, a subject for exchanging information for access control and state management uses NF names (e.g., access and mobility management function (AMF), session management function (SMF), network slice selection function (NSSF), etc.). However, embodiments of the present invention may be applied equally even if the NF is actually implemented as an instance (an AMF instance, an SMF instance, an NSSF instance, etc.).

Recently, edge computing which transmits data using an edge server is under discussion. The edge computing may include, for example, multi-access edge computing (MEC), or fog computing. The edge computing may indicate a technology for providing data to an electronic device via a separate server (hereafter, an edge server or a MEC server) installed at a location geographically close to the electronic device, for example, inside or near a base station. For example, an application requiring low latency among at least one application installed in the electronic device may transmit and receive data via the edge server installed at the geographically close location, without passing through a server located in an external data network (DN), for example, internet.

Constant discussions are conducted on an architecture for implementing the edge computing service in the 3GPP next-generation communication system. The edge computing may be called mobile edge computing, or multi-access edge computing. In various embodiments of the present disclosure, the edge computing shall be referred to as MEC for convenience. The MEC is a technology which installs a wireless base station or a gateway (or a user plane function (UPF)) close to the wireless base station, deploys various services and caching contents close to a user terminal by applying a distributed cloud computing technology on it, thus alleviates congestion of a mobile core network, achieves low-latency communication in data communication with the terminal, and creates a new service based on it.

The MEC provides application developers and content providers with cloud computing capability and information technology (IT) service environment at a mobile network edge. In particular, the MEC provides ultra low latency and large bandwidth to application applications, and allows to access real-time network information. Accordingly, application applications which provide the MEC service may provide the MEC service to the terminal over the 5G system (5GS). In addition, the 5G system may provide a function for the terminal using the MEC service to access the MEC system. In addition to the 5G system, the 4G system may also provide the function for the MEC service.

The present disclosure relates to an apparatus and a method for providing server information to a terminal in a wireless communication system, and more particularly, to an apparatus and a method for providing application server information to the terminal in the wireless communication system.

To achieve the above object, various embodiments of the present disclosure provide a method of distinguishing traffic to be transmitted from a wireless communication network to an edge computing cloud.

In addition, various embodiments of the present disclosure provide a method for requesting from a wireless communication network to allow a 3rd party edge cloud service provider, that is, an edge computing cloud provider to steer traffic to its edge computing cloud.

In addition, various embodiments of the present disclosure provide a method for subscribing a latency related event in a wireless communication system for a 3rd party edge cloud service provider, that is, an edge computing cloud provider guarantee latency below 10 ms.

In addition, various embodiments of the present disclosure provide a method for discovering and selecting a local network exposure function (NEF) to provide network capability information usable to service an edge computing service to a 3rd party edge cloud provider, that is, an edge computing cloud provider.

According to embodiments of the present disclosure, the 3rd party edge computing cloud service provider, that is, the edge computing cloud provider may provide information to the 5G system to steer traffic to an application server operated in its edge computing cloud, and thus realize traffic routing which provides the lowest latency to a terminal.

According to various embodiments of the present disclosure, the 3rd party edge computing cloud service provider, that is, the edge computing cloud provider may receive a notification for identifying latency occurring in a wireless communication network from a wireless communication system. In addition, latency information included in the notification is valid only in user plane connectivity connected to the edge computing cloud.

Hence, according to various embodiments of the present disclosure, since corresponding network information does not need to be transferred to the NEF located in the center of the wireless communication system and is used only locally, necessary processing of the NEF located at the center may be reduced.

In addition, according to various embodiments of the present disclosure, since this information is processed through the local NEF, routing for delivering to a central NEF is not required and accordingly faster processing is possible.

A terminal described below needs to access an edge application server to use the edge computing service. However, the edge application server may be deployed for each region, or may be deployed on an edge computing cloud in an edge data network deployed in each region. Thus, the terminal needs to be able to obtain an internet protocol (IP) address of the edge application server accessible in the corresponding region. In general, the terminal acquires the IP address of the edge application server by using a domain name system (DNS) procedure. Next, the terminal transmits data traffic to the corresponding server, and the 5G system needs to transmit this traffic through a UPF connected to the edge application cloud in which the corresponding edge application server is running.

Figure 1A:
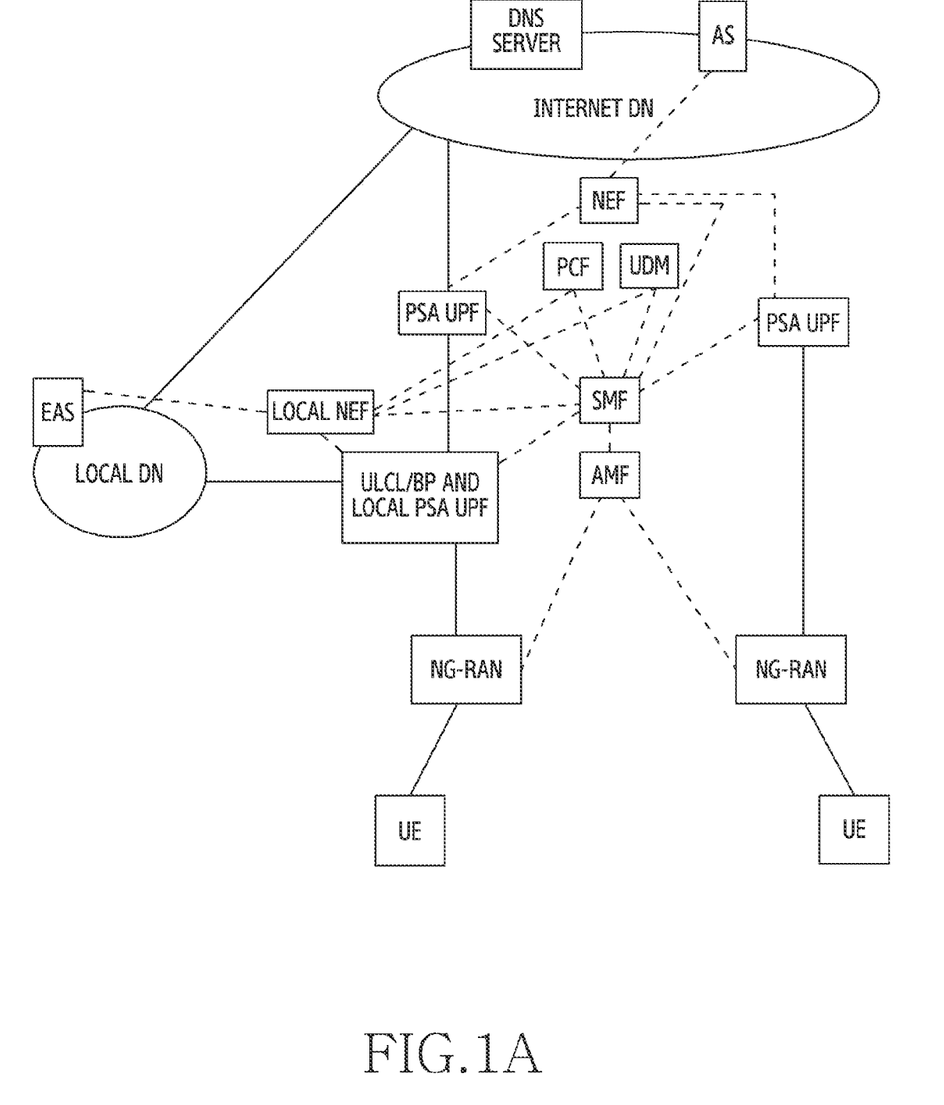
FIG. 1A illustrates a structure of a wireless communication system according to various embodiments of the present disclosure.

FIG. 1A illustrates a structure of a wireless communication system according to various embodiments of the present disclosure.

Specifically, FIG. 1A illustrates a system architecture of a 5G wireless communication system which provides an edge computing service and relationships of a 3rd party edge computing cloud service provider, that is, an edge computing cloud provider according to various embodiments of the present disclosure.

Network entities or network nodes illustrated in FIG. 1 are as follows.

A core network (CN) of 5G may include the following network functions. Herein, the network functions each may be one network node. One network node may take a physically and/or logically independent form, and may be configured together with other specific node. Also, the network functions each may be implemented with a specific device as explained earlier. As another example, the network functions each may be implemented by combining a device and software. As yet another example, the network functions each may be implemented as software in a device on a specific collective network.

Hereinafter, each network function (NF) shall be described. In various embodiments of the present disclosure, an NF device performing each NF may be regarded as being included in the NF.

An AMF is an NF which manages wireless network access and mobility of a terminal.

An SMF is an NF which manages packet data network connection provided to a terminal. This connection is called a protocol data unit (PDU) session.

A policy control function (PCF) is an NF which applies to the terminal a service policy, a charging policy, and a PDU session policy of a wireless communication provider.

User data management (UDM) is an NF which stores subscriber information.

The NEF is an NF which may access information for managing terminals in the 5G network, and perform mobility management event subscription of the corresponding terminal, session management event subscription of the corresponding terminal, session related information request, charging information setting of the corresponding terminal, and PDU session policy change request of the corresponding terminal. In addition, the NEF may provide a function for providing to the 5G network and storing necessary information for the service in the UDR.

The NEF may be deployed and operated for each location, and the NEF may be deployed for a data network existing in a specific region. This may be referred to as a local NEF. The local NEF may provide information exposed in the 5G network to an application function (AF) belonging to a corresponding region or a corresponding data network.

In FIG. 1A, a next generation-radio access network (NG-RAN) indicates a base station which provides a wireless communication function to the terminal.

The UPF is an NF which serves as a gateway for forwarding packets transmitted and received by the terminal.

The UPF may be located and accessed near and access an edge data network which is a local data network to support the MEC. Accordingly, the UPF may transmit data to the edge application server. That is, it may achieve low latency transmission by forwarding a data packet to the edge application server in the edge data network without going through the internet. The UPF may also be connected to a data network connected over the internet, and data to be delivered over the interact among packets transmitted by the terminal may be routed to an internet data network.

The UPF may be a PDU session anchor UPF (PSA UPF) which serves as an anchor of the PDU session connected to the data network. Every data transmitted by the terminal to the data network is delivered through the PSA UPF serving as the anchor. A data packet destined for a centralized data network or the internet data network is delivered to the PSA UPF of the corresponding PDU session. Likewise, if the edge data network is deployed for each specific region like a local data network, there may be a local PSA UPF accessible over the corresponding local data network. A PDU session for this local PSA UPF may exist independently.

Alternatively, it may be connected to an uplink classifier (ULCL) UPF or a branching point (BP) UPF (a PDU session supporting internet protocol version 6 (IPv6) multi-homing may be connected to several PSA UPFs based on a branching point UPF) and connected to a local PSA UPF divided to the local data network in one PDU session. The ULCL UPF or the BP UPF may determine whether to transmit to the local PSA UPF or another PSA UPF, based on the IP address (i.e., a target IP address) transmitted by the terminal. The ULCL UPF or the BP UPF itself may serve as the local PSA UPF. Hence, it may provide the function for transmitting a packet to the local data network.

The SMF is an NF for inserting/replacing/removing the ULCL UPF or the BP UPF according to a terminal location or a network deployment situation. That is, the SMF which provides a PDU session for transmitting data to the centralized data network such as the internet data network or the cloud may, if determining presence of the local data network accessible by the terminal at a specific location, insert the ULCL UPF or the BP UPF to provide data connection to the corresponding local data network. In this case, only the data connection structure in the network may be changed without impact of the terminal. That is, the packet transmitted by the terminal may be divided and transmitted to the local data network or the central data network only through the operation of the 5G behind the terminal.

In addition, the SMF may provide a function which is a session and service continuity (SSC) mode. This follows an SSC mode definition defined in 3GPP. The SMF may change the PSA in SSC mode 2 or SSC mode 3, and accordingly if there is an edge data network accessible by the terminal based on the current location of the terminal, newly allocate a PSA for connecting the corresponding edge data network, and change or newly create a PDU session to transmit data through the PSA. It may trigger the terminal to change a data path by performing a PDU session modification procedure, or to establish a new PDU session. With the insertion/replacement of the ULCL UPF or the BP UPF, or the operation according to the SSC mode as mentioned above, the SMF may enable the terminal to connect to the local data network which is the edge data network, and thus the terminal may access an edge application server or a local DNS server in the local data network.

Also, there may be a DNS server for the MEC service. The DNS server may be used to resolve the IP address of the application server running in the edge data network. The DNS server may exist for each edge data network which covers a specific region, or may exist in the central cloud. If the DNS server for the MEC exists in the central cloud, this DNS server needs to know edge server information installed throughout the network and information of application servers which may be provided in the MEC system.

In addition, the DNS server may support a zone function for distinguishing a resource or an IP domain of a specific region, or a specific namespace. It indicates a kind of zone identifier for the DNS server to identify an IP domain to find, an IP range to find, a zone to find the deployed data network, or a zone to find the deployed edge computing environment. In addition, this may be information for indicating zone division of the IP domain, or zone or topology division of available cloud resources.

The terminal may access the 5G system (or the 3GPP network) through the 5G base station, and establish data connection. To provide the MEC service to the terminal, the 5G system may allocate a UPF for accessing the corresponding edge data network, and the terminal may communicate with the third party application server running at the edge, that is, the edge application server through this UPF.

A third party internet service provider, for example, a cloud service provider may provide the edge computing service by itself. In other words, the cloud service provider itself may build an edge data network in various regions, and deploy to connect with the wireless communication system of a mobile network operator (MNO) over the corresponding to edge data network. The third party service provider may negotiate with the PCF or the NEF of the 3GPP network. Through this negotiation, necessary information for using the MEC service may be provided to the 5G wireless communication system through the PCF or the NEF.

Figure 1B:
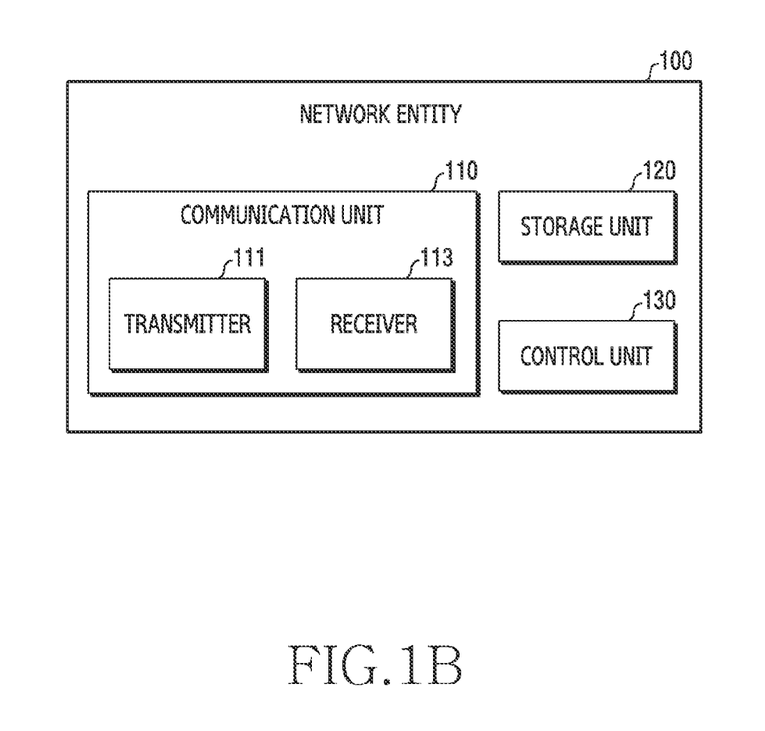
FIG. 1B illustrates a configuration of a network entity in a wireless communication system according to various embodiments of the present disclosure.

FIG. 1B illustrates a configuration of a network entity in a wireless communication system according to various embodiments of the present disclosure.

In various embodiments of the present disclosure, the network entity is a concept including the NF according to a system implementation. A term such as '~unit' or '~er' used hereafter indicates a unit for processing at least one function or operation, and may be implemented using hardware, software, or a combination of hardware and software.

The network entity according to various embodiments of the present disclosure may include a communication unit 110, a storage unit 120, and a control unit 130 for controlling general operations of a network entity 100.

The communication unit 110 transmits and receives signals to and from other network entities. Accordingly, whole or part of the communication unit 110 may be referred to as a transmitter 111, a receiver 113, or at least one transceiver/transceiver 110.

The storage unit 120 stores data such as a basic program, an application program, and setting information for operations of the network entity 100. The storage unit 120 may include a volatile memory, a non-volatile memory or a combination of a volatile memory and a non-volatile memory. In addition, the storage unit 120 provides the stored data at a request of the control unit 130.

The control unit 130 controls the general operations of the network entity 100. For example, the control unit 130 transmits and receives signals through the communication unit 110. In addition, the control unit 130 records and reads data in the storage unit 120. The control unit 130 may perform functions of a protocol stack required by the communication standard. For doing so, the control unit 130 may include a circuit, an application-specific circuit, at least one processor or a micro-processor, or may be a part of a processor. Also, a part of the communication unit 110 and the control unit 130 may be referred to as a communication processor (CP). The control unit 130 may control the network entity 100 to perform any one operation of the various embodiments of the present disclosure.

It is noted that the communication unit 110 and the control unit 130 are not necessarily implemented as separate modules, and may be implemented as a single component in the form of a single chip or a software block. The communication unit 110, the storage unit 120, and the control unit 130 may be electrically connected. In addition, the operations of the network entity 100 may be realized by including the storage unit 120 which stores corresponding program codes in the network entity 100.

The network entity 100 includes a network node, and the network node may be any one of a base station (RAN), a user equipment (UE), an NF, an AMF, an SMF, a UPF, an NEF, an NRF, a CF, an NSSF, a UDM, an AF, AUSF, an SCP, a UDSF, a context storage, operation administration and maintenance (OAM), EMS, a configuration server, and an ID management server.

The 5G system according to various embodiments of the present disclosure may include a terminal, a base station, and a 5G core network. The 5G core network may include NFs such as AMF, SMF, PCF, UPF, UDM, UDR, NEF, NSSF, NRF, and SCP. According to various embodiments of the present disclosure, the NF may indicate the network entity (NE) or a network resource. The NG-RAN (5G-RAN, RAN) indicates a base station for providing the wireless communication function to the UE. The UE may access the 5G core network through the base station.

In addition, various NFs explained below may be configured with one specific physical device or two or more physical devices. Besides, the physical devices each may include a program, or software for executing methods described below under control of a processor included therein. The following description suggests only names for the NFs respectively for convenience of explanation, but it is apparent to those skilled in the art that it may be implemented as a physical device including at least one processor as above, and may be equipped with a program or software for the operations explained in the present disclosure. Accordingly, the expression 'device' shall be omitted in the following, and only a specific NF name will be described.

Figure 2:
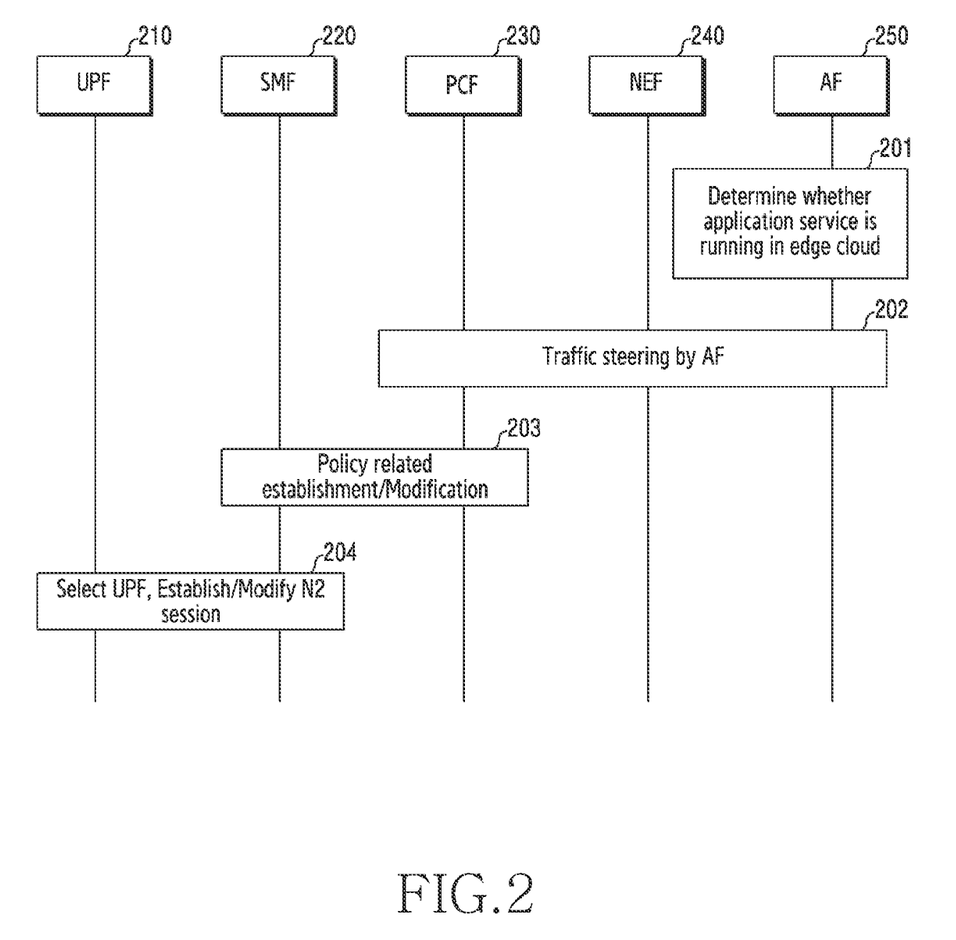
FIG. 2 illustrates a process of providing steering information in a wireless communication system according to various embodiments of the present disclosure.

FIG. 2 illustrates a process of providing steering information in a wireless communication system according to various embodiments of the present disclosure.

Specifically, FIG. 2 illustrates the process for providing the steering information to the 5G system such that a third party providing a cloud service and an edge computing service may transmit traffic to an application server operated in its managed edge computing cloud according to various embodiments of the present disclosure.

FIG. 2 illustrates the process in which a third party cloud service provider (3rd CSP) requests traffic routing of a UE from the 5G system according to various embodiments of the present disclosure.

The 3rd CSP may provide the service by allocating an IP address of an application server running in its edge computing environment. The 3rd CSP may determine to provide the 5G system with the IP address of the application server running in the edge computing environment, and additionally request the 5G system to route traffic having the corresponding IP address as a target IP through a UFP connected with its operating edge computing environment. By contracting with the MNO, the 3rd CSP may build their edge computing service environment on an infrastructure of the MNO in a specific region, and allow the UE to use the edge application server running in the corresponding environment. This is the edge computing system which is configured based on the contract between the MNO and the 3rd CSP, which is not known to the UE. To allow the UE to use the edge computing environment of the 3rd CSP running in the specific region, if the UE transmits traffic to the application server, the MNO needs to be able to transmit the traffic to the edge application server running on the edge computing environment of the 3rd CSP. For doing so, the 5GS needs to steer uplink traffic of the UE to a PSA-UPF connected to the edge computing environment of the 3rd CSP. This PSA-UPF, or a PSA-UPF which may serve as the ULCL/branching point may transmit the uplink traffic of the UE via an N6 interface connected to the edge computing environment of the 3rd CSP. For this, the embodiment of FIG. 2 proposes the process in which the 3rd CSP requests the traffic steering and the ULCL/branching point setting from the MNO.

The 3rd CSP may identify an instance of the application server running in its edge cloud environment. For example, if an application server of a game A starts running in its edge cloud, the 3rd CSP may allocate or acquire an IP address of the corresponding application server, and thus register this IP address in the DNS service provided by the 3rd CSP. Next, if the UE transmits a DNS query to obtain the IP address of the application server which provides the game A, the DNS service operated by the 3rd CSP may return the IP address of the application server based on a UE location or information transmitted by the UE. In other words, the 3rd CSP provides the UE with the IP address of the edge application server for the UE to use the edge computing service, and the UE may use the edge computing service by transmitting data to the IP address of the edge application server.

However, the above-described operation is not sufficient for the UE to use the edge computing service. Since the traffic transmitted by the UE is transmitted through the 5G system, the 5G system should transmit the traffic of the UE to the UPF which is closest to the UE location, and the edge data network or the edge cloud environment where the edge application server are running.

In the following embodiments, operations of an AF 250 are operations of the AF operated by the 3rd CSP. In the following embodiments, the operations of the AF 250 are operations performed by the 3rd CSP by operating the AF 250. In the following embodiments, the operations of the AF 250 may be understood as operations directly performed by the 3rd CSP instead of the AF 250, unlike FIG. 2.

In step 201, the AF 250 operated by the 3rd CSP, that is, the AF 250 of the 3rd CSP knows the edge application server running in the edge cloud environment of the 3rd CSP. This may be obtained by allocating the IP address of the application server newly driving, or it may be obtained by acquiring the IP address from the newly driving application server. The AF 250 of the 3rd CSP may determine to request the 5G system to transmit traffic transmitted to the IP address of the edge server running in the edge cloud environment to its edge cloud environment.

According to step 201, the AF 250 of the 3rd CSP may configure information to request from the 5G system. The information requested by the AF 250 of the 3rd CSP from the 5G system is as follows.

(1) IP descriptor: may include the IP address of the edge application server running in the edge cloud environment of the 3rd CSP and additionally an IP port number. In addition, an identifier for distinguishing a transmission control protocol (TCP) or a user datagram protocol (UDP) may be included.

(2) Data network name (DNN): indicates a name for identifying a data network for using the edge computing service provided by the 3rd CSP, or for accessing the edge computing environment provided by the 3rd CSP. The 3rd CSP may define this DNN in service contract with the MNO. The edge computing service may be identified, or the 3rd CSP may be identified through the DNN.

(3) Traffic steering policy ID for edge computing service: is an identifier indicating whether to allocate the UPF connected to the edge cloud environment of the 3rd CSP, whether to use the ULCL in the corresponding UPF, or whether to use the branching point. The 3rd CSP may negotiate in advance connection information or connection policy of the edge cloud environment and the PSA-UPF through a service level agreement (SLA) with the MNO, and define and set this as the traffic steering ID. This ID is an ID for identifying the policy indicating whether the PSA-UPF or the UPF connected to the corresponding edge cloud environment should apply the ULCL UPF, or the IPv6 multi-homing based branching point UPF. Also, if the SMF 220 selects the UPF 210, the traffic steering ID may be used to select a UPF supporting the corresponding traffic steering ID.

(4) Data network access identifier (DNAI): The 3rd CSP may include the DNAI for identifying the edge computing environment, the edge computing resource, or the edge data network for the edge computing service. The 3rd CSP may include the DNAI to notify information for identifying which edge computing environment, edge computing resource, or edge data network is to use.

(5) Location information: If separately operating the edge computing environment for a specific region, and also operating resources for each region to find the address of the edge application server running in the corresponding edge computing environment, the 3rd CSP may provide the location information. The location information may have the form of a civic address (e.g., a street address, a building address, a si/gun/gu, etc.) or global positioning system (GPS) information (a specific GPS range value), a postal ZIP code, a tracking area ID, or cell ID. It may indicate that the request transmitted by AF 250 should be applied for the location information.

The information may be configured in pairs, and may be configured as a list including at least one or more pairs.

In step 202, the AF 250 of the 3rd CSP transmits a traffic steering request to the 5G system, and in this case, the traffic steering request may include the information configured in step 201. If the AF 250 of the 3rd CSP may transmit the traffic steering request directly to the PCF 230, it may transmit the traffic steering request through an Npcf_PolicyAuthorization_Create service operation or an Npcf_PolicyAuthorization_Update service operation. If the AF 250 of the 3rd CSP may not transmit the request directly to the PCF 230, it may transmit the traffic steering request through an Nnef_TrafficInfluence_Create service operation or an Nnef_TrafficInfluence_Update service operation which is a service operation provided by the NEF 240, and in this case, the traffic steering request may include the information configured in step 201.

If receiving the location information from the AF 250 of the 3rd CSP along with the steering request, the NEF 240 may map the corresponding location to the tracking area ID or the cell ID which is a location n information format which may be understood in the 3GPP. The NEF 240 transfers necessary information for the traffic steering through an Npcf_PolicyAuthorization_Create service operation or an Npcf_PolicyAuthorization_Update service operation based on the steering request received from the AF 250 of the 3rd CSP.

The PCF 230 receiving the traffic steering information in step 202 may determine the following operation.

(1) The PCF 230 may configure an IP filter, to perform the ULCL or IPv6 multi-homing-based branching point operation on the received IP descriptor. That is, uplink traffic transmitted for the IP address of the edge application server running in the edge cloud environment of the 3rd CSP as the target IP may be configured to be processed at the ULCL or the branching point UPF, and routed to the N6 interface connected to the edge cloud environment of the 3rd CSP.

(2) For the received traffic steering ID, the PCF 230 may determine a policy of whether the corresponding information indicates the ULCL, or the IPv6 multi-homing based branching point, or whether to select a UPF connectable to a specific N6 interface. This may be information negotiated in advance through the SLA between the MNO and the 3rd CSP.

(3) The PCF 230 may configure session related policy information for the received location information or DNAI. This is forwarded to the SMF 220. Hence, the SMF 220 may determine to apply the session related policy to the UPF 210 for covering the region corresponding to the location information, or determine to select the UPF 210 supporting the corresponding DNAI.

In step 203, the PCF 230 may configure a session related policy to be provided to the SMF 220 based on the request for the traffic steering received from the AF according to the operation of step 202. The PCF 230 transfers this information to the SMF 220 through a policy association establishment establishment procedure with the SMF or a policy association modification procedure. This information may be provided to the SMF 220 as a policy and charging control rule (PCC rule) or traffic steering control information. This information may include an IP traffic filter, that is, the IP address of the edge application server running in the edge cloud environment of the 3rd CSP, and may include a traffic steering policy instructing to set the ULCL UPF or the IPv6 multi-homing based branching point UPF based on the IP traffic filter, a traffic steering policy ID for identifying the traffic steering policy, location information for applying the corresponding traffic steering policy, or DNAI information. This is based on the information received from the AF 250 of the 3rd CSP in step 202.

In step 204, the SMF 220 may select a UPF according to a session management policy set from the PCF 230, and set a traffic steering rule to the UPF 210 through an N4 session establishment procedure or modification procedure. The procedure of step 204 may be performed if the UE establishes the PDU session. Alternatively, if the UE already has the PDU session established, it may be performed according to the location of the UE, and the location information of the UE follows the information received from the PCF 230 in step 203. That is, it may be determined to apply the traffic steering policy if the UE is located at the corresponding location. Hence, the SMF 220 may set the UPF 210 to perform the ULCL operation or the branching point operation, or may select a new UPF. The UPF 210 may determine the traffic destined for the edge application server transmitted by the UE based on the target IP address of the uplink packet transmitted by the UE, and route the distinguished traffic to a PSA-UPF connected with the edge environment of the 3rd CSP. The PSA-UPF may transmit the corresponding traffic to the edge environment of the 3rd CSP and thus provide a traffic transmission path between the UE and the edge application server.

Figure 3:
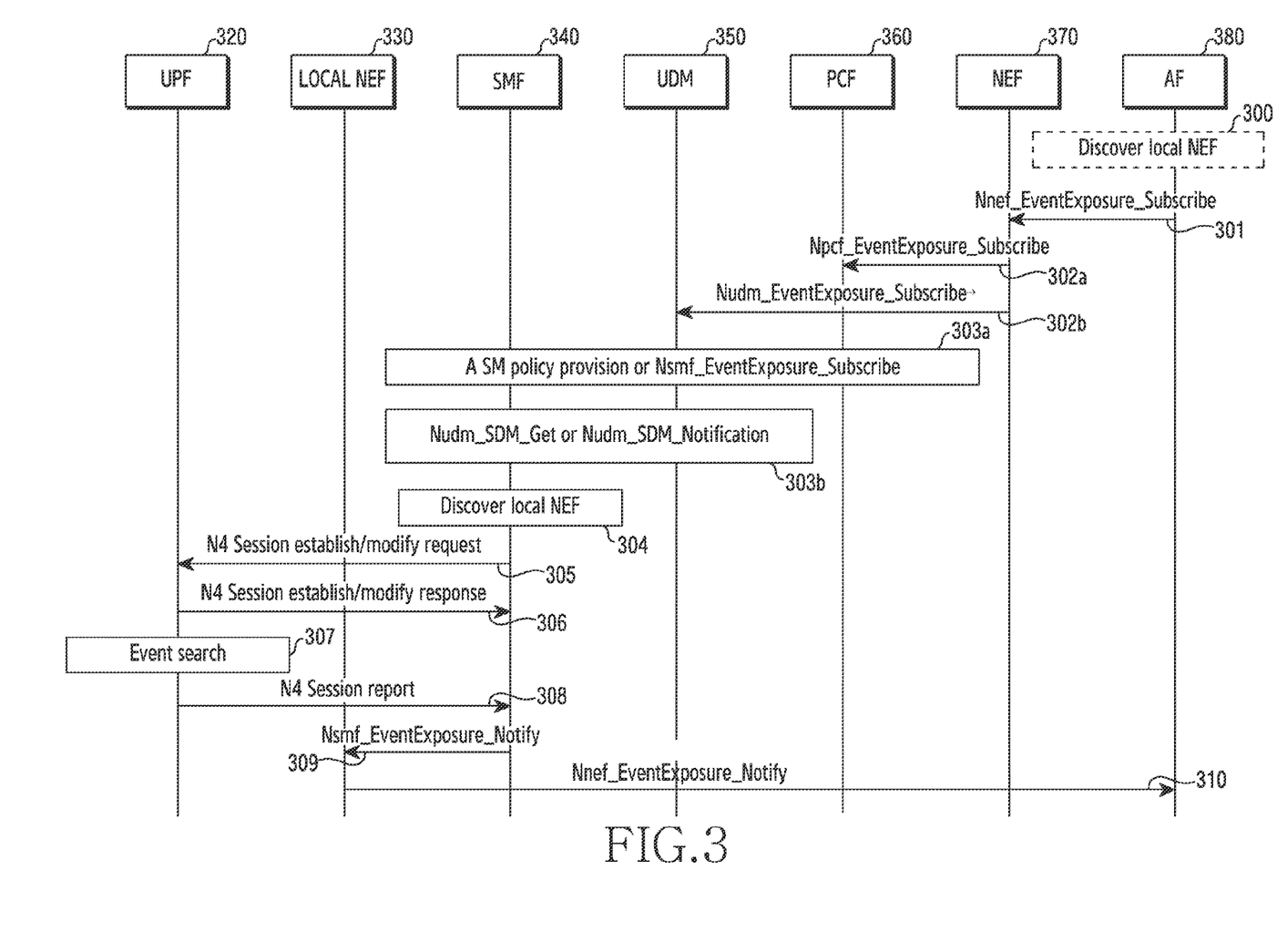
FIG. 3 illustrates a process of subscribing a service for an edge computing service through a local network exposure function (NEF) in a wireless communication system according to various embodiments of the present disclosure.

FIG. 3 illustrates a process of subscribing a service for an edge computing service through a local NEF in a wireless communication system according to various embodiments of the present disclosure.

Specifically, FIG. 3 shows the process for, if a third party providing a cloud service and an edge computing service subscribes to an event for the edge computing service in a 5G system, subscribing to the event and receiving a notification through a local NEF according to various embodiments of the present disclosure.

In the following embodiments, an operation of the AF 380 is the operation of the AF operated by the 3rd CSP. In the following embodiments, the operation of the AF 380 is the operation performed by the 3rd CSP by operating the AF 380. In the following embodiments, the operation of the AF 380 may be understood as the operation directly performed by the 3rd CSP instead of the AF 380, unlike FIG. 3.

FIG. 3 illustrates the process in which the AF 380 of the 3rd CSP requests exposure of network capability to be used for the edge computing service from the 5G system.

The embodiment of FIG. 3 suggests the process for subscribing to the event requested by the AF 380 of the 3rd CSP to transmit the notification if transmission latency of user traffic exceeds a specific value. In addition, the embodiment of FIG. 3 suggests the process for discovering the local NEF for the network capability exposed within the edge computing environment or the edge data network and performing the network capability exposure through the local NEF.

According to various embodiments of the present disclosure, the AF of the 3rd CSP indicates an application server which may negotiate with the 3GPP system, among servers running in the system operated by the 3rd party cloud service provider, that is, which may use an application programming interface (API) provided in the 3GPP system. Accordingly, the AF 380 of the 3rd CSP may be referred to as an AF.

According to various embodiments of the present disclosure, the AF 380 of the 3rd CSP may subscribe the following event to the 3GPP system for the edge computing service, and the 3GPP system may transmit a notification to the AF 380 of the 3rd CSP according to the subscribed event.

(1) New event: latency threshold—This is a value indicating latency occurring if traffic is transmitted between the UE and the edge application server in the PDU session used by the UE. The AF 380 of the 3rd CSP may perform an operation such as setting a different traffic routing path or modifying the traffic path to another edge application server if the latency over a specific value occurs in the traffic transmission for its service. Accordingly, the AF 380 of the 3rd CSP may be set to receive the notification according to the new event called the latency threshold if the latency greater than or equal to the specific value occurs. For example, if the latency threshold is set to 10 ms, the event is subscribed to notify if the data transmission latency between the UE and the edge application server is found to be 10 ms or more. This event may be subscribed together with the following additional information.

(2-1) Event additional information: the number of hops of UPFs (e.g., 1 hop, 2 hops)—This indicates the number of UPFs going through the data routing if the UE transmits data to the edge application server. For example, if the traffic from the UE is transmitted to the data network of the edge application server via two UPFs, the number of the hops is 2. If the traffic from the UE is transmitted to the data network of the edge application server via one PSA-UPF, the number of the hops is 1. The 3GPP system may also transfer the number of the hops to the AF 380 of the 3rd CSP, and if the latency value is high, the AF 380 of the 3rd CSP may retransmit the traffic steering request or modify the traffic steering rule to reduce the number of the hops.

(2-2) Event additional information: expected data volume—This indicates a data size required to check the traffic latency between the UE and the edge application server. That is, if the AF of the 3rd CSP 380 subscribes to an event for latency of 10 ms, this is to suggest a guideline for the data size having the latency of 10 ms. For example, data of 1 Mbyte does not significantly affect the service even if the latency of 10 ms is measured and the latency over 10 ms occurs. However, if the measured latency exceeds 10 ms, the data of 100 Mbyte may degrade the quality of service. Accordingly, the 3GPP system may provide the 3GPP system with the expected data volume to measure the latency occurring in the data transmission of an effective size in terms of the service quality, without calculating the latency for every packet.

(2-3) Additional event information: average time window—This indicates a time window to be measured to check the traffic latency between the UE and the edge application server. For example, if the time window is 10 minutes, if measuring the latency between the UE and the edge application server, the traffic latency value may be derived as an average of values identified for 10 minutes. The latency occurring every second may be too frequent to process even if the AF 380 of the 3rd CSP receives the notification. Accordingly, if the average value of the latency measured for a relatively long time is used, the AF 380 of the 3rd CSP may also use it to improve the quality of service by using the notification thereof.

(2-4) Event additional information: edge computing service area—This is information indicating a service area for the AF 380 of the 3rd CSP to utilize in the edge computing service through the event subscription. For example, if an event is subscribed to utilize the edge computing service in the Seoul area or the edge computing environment or the edge data network in the Seoul area, its service area information may be included. This service area information may include a cell ID list, a tracking area ID list, a base station ID list, or GPS information.

(2-5) Event additional information: notification target address—This is information included if the AF 380 of the 3rd CSP designates an address of the target AF for receiving the event notification.

The AF 380 of the 3rd CSP may configure a message for subscribing the above event to the 3GPP system. For doing so, the AF 380 of the 3rd CSP may use the Nnef_EventExposure service operation provided by the 3GPP system.

In step 300, the AF 380 of the 3rd CSP may perform an operation for discovering a local NEF 330 which provides the network capability exposure function in the edge computing environment or the edge data network operated by the 3rd CSP, or the edge computing environment or the edge data network where the AF 380 of the 3rd CSP is running to subscribe the above-described event. This follows the embodiment of the present disclosure according to FIG. 4. The AF 380 of the 3rd CSP may directly perform the operation of discovering the local NEF 330, or select the local NEF 330 by using an address of the local NEF 330 for each area/edge data network set through the contract with the MNO in advance. Alternatively, the AF of the 3rd CSP may request to discover the NEF existing in a specific location using a common API framework (CAPIF) core function, and the CAPIF core function may reply to the AF 380 of the 3rd CSP with the address of the local NEF 330 providing the exposure service in the area requested by the AF 380 of the 3rd CSP.

The AF 380 of the 3rd CSP may subscribe to an event through the central NEF, without discovering the local NEF 330.

In step 301, the AF 380 of the 3rd CSP may subscribe the event to the 3GPP system by including at least one or more of the latency threshold event and its event additional information. In addition, the AF 380 of the 3rd CSP may include a general public subscription identifier (GPSI) or a subscription permanent identifier (SUPI) as a UE identifier for identifying the terminal. Alternatively, the AF 380 of the 3rd CSP may include the IP address of the UE to identify the UE. In yet another embodiment, the AF 380 of the 3rd CSP may subscribe to an event for identifying latency of traffic transmitted to the corresponding edge computing environment in the 3GPP system, rather than subscribing to the event for each UE, wherein the DNN value used for the edge computing may be included to identify the PDU session used for the edge computing without including the UE identifier or IP address. Alternatively, the AF 380 of the 3rd CSP may subscribe to the event to measure and notify latency of traffic using the corresponding N6 interface, by including DNAI or N6 routing ID for identifying the N6 interface which is the data connection between the 3GPP system and the edge computing environment. Also, the AF 380 of the 3rd CSP may include an AF ID for identifying the 3rd CSP.

The AF 380 of the 3rd CSP may request event subscription from the NEF by using an Nnef_EventExposure_Subscribe service operation.

The NEF 370 receiving this may subscribe to the event through the PCF 360, or may subscribe to the event through the UDM. Step 302a and step 303a describe the event subscription through the PCF 360, and step 302b and step 303b describe the event subscription through the UDM 350. If an event request including the DNAI or the N6 routing ID is received, the event is subscribed through the PCF 360.

In step 302a, the NEF 370 receiving the request of step 301 may subscribe the event to the PCF 360. At this time, the NEF 370 uses the Npcf_EventExposure_subscribe service operation. The NEF 370 transmits to the PCF the identifier/IP address received in step 301, the DNN, the DNAI or the N6 routing ID together with the event ID for the latency threshold. The PCF receiving this may store it as the event for the corresponding UE if the UE identifier is included, store it as the event for the corresponding data flow if the IP address of the UE is included, and store it as the event for the corresponding DNN if the DNN is included, and store it as the event of the UPF using the corresponding N6 interface if the DNAI or the N6 routing ID is included.

In step 302b, the NEF 370 receiving the request of step 301 may subscribe the event to the UDM 350. At this time, the NEF 370 uses a Nudm_EventExposure_subscribe service operation. The NEF 370 transmits to the UDM 350 the UE ID or the DNN received in step 301, the event ID for the latency threshold, and the additional event information together. The UDM 350 receiving this may store as the event in session management context of the corresponding UE if the UE identifier is included, and store as the event for the corresponding DNN in session management subscription data if the DNN is included.

In step 303a, the PCF 360 may perform an operation for setting a corresponding event the SMF 340, according to the event subscription request received from step 302a. In so doing, the PCF 360 may determine to notify the corresponding event through the local NEF 330. This may be determined based on determination of the PCF 360 that the AF ID included in the event request or the event request is for the edge computing service. Hence, the PCF 360 may determine to perform the event notification through the local NEF 330 and then perform at least one of the following operations.

1. The PCF 360 may include in the subscription information delivered to the SMF 340 an indicator that the SMF 340 discovers the local NEF 330, and performs an operation of transmitting the event notification through the local NEF 330.

2. The PCF 360 may identify edge computing service area information included in the event subscription request, and perform an operation for discovering the local NEF 330 serving the corresponding area. This may follow the embodiment suggested in FIG. 4. Alternatively, the address of the local NEF 330 may be acquired according to a preset value. As such, the PCF 360 may discover the local NEF 330, store its address value, and then include the address value of the local NEF 330 into the event subscription information transmitted to the SMF 340.

In addition, the PCF 360 configures event subscription information to transmit to the SMF 340 in operation 1 or 2, and then includes an address of a target AF for receiving the event notification. The address of the target AF may be the AF 380 of the 3rd CSP. Alternatively, if the AF 380 of the 3rd CSP sets the AF receiving the event notification as another AF, the address of the target AF may be the address of the target AF requested by the AF 380 of the 3rd CSP. The PCF 360 may provide the event subscription information configured as described above as an Nsmf_EventExposure-_subscribe service operation, or provide as a session related event through an SM policy association procedure.

In step 303b, the UDM 350 may perform an operation for setting the corresponding event to the SMF 340, according to the event subscription request received in step 302b 2b. In so doing, the UDM 350 may determine that the corresponding event should be notified through the local NEF 330. This may be determined based on determining of the UDM 350 that the AF ID included in the event request or the event request is for the edge computing service. Accordingly, the UDM may determine to perform the event notification through the local NEF 330, and then perform at least one of the following operations.

1. The UDM 350 may include in the subscription information delivered to the SMF 340 an indicator that the SMF 340 discovers the local NEF 330 and performs the operation of transmitting the event notification through the local NEF 330. Herein, the transmitted message may be, for example, an Nudm_SDM_Get message.

2. The UDM 350 may identify edge computing service area information included in the event subscription request, and perform the operation of discovering the local NEF 330 serving the corresponding area. This may follow the embodiment suggested in FIG. 4. Alternatively, the address of the local NEF 330 may be acquired according to a preset value. As such, the UDM 350 may discover the local NEF 330, store the address value of the local NEF 330, and then include it in event subscription information transmitted to the SMF. Herein, the transmitted message may be, for example, an Nudm_SDM_Notification message.

In addition, the UDM 350 configures event subscription information to transmit to the SMF 340 in operation 1 or 2, and then includes the address of the target AF for receiving the event notification. The address of the target AF may be the AF 380 of the 3rd CSP. Alternatively, if the AF 380 of the 3rd CSP sets the AF receiving the event notification to another AF, the address of the target AF may be the address of the target AF requested by the AF 380 of the 3rd CSP. The UDM 350 may transfer the event subscription information configured as described above to the SMF as SM related context in an Nudm_SDM_Get service operation or an Nudm_SDM_notification service operation.

In step 304, the SMF 340 receiving the event subscription information for the latency threshold in step 303a or step 303b may perform a procedure for discovering the local NEF 330, if the information received in step 303a or step 303b includes the indicator that 'Discover the local NEF 330 and perform the operation of transmitting the event notification through the local NEF 330'. This follows the embodiment suggested in FIG. 4.

In step 305 5, the SMF 340 may request and direct the UPF 320 to measure the latency for the event subscription for the latency threshold received in step 303a or 303b. This may be provided through the N4 session establishment if a new UPF is allocated, and may be provided to the UPF 320 through an N4 modification procedure if event related information is set in the existing UPF. Hence, the SMF 340 may set the following information received in step 303a or step 303b to the UPF 320.

(1) Latency threshold event: This is the value indicating latency occurring if traffic is transmitted between the UE and the edge application server in the PDU session used by the UE. For example, if the latency threshold event value is set to 10 ms, the event is configured to give a notification if the data transmission latency between the UE and the edge application server is found to be 10 ms or more. The latency is measured by the UPF 320. If the following event additional information is included in measuring this latency, the UPF 320 may perform by considering it.

(2-1) The number of hops of UPFs (e.g., 1 hop, 2 hops): This indicates the number of UPFs going through the data routing if the UE transmits data to the edge application server. For example, if the traffic from the UE is transmitted to the data network of the edge application server via two UPFs, the number of the hops is 2. If the traffic from the UE is transmitted to the data network of the edge application server via one PSA-UPF, the number of the hops is 1. If this information is set, the UPF 320 may notify the number of hops in current traffic routing together with the latency value.

(2-2) Expected data volume: This indicates the data size required to check the traffic latency between the UE and the edge application server. That is, if the AF of the 3rd CSP 380 subscribes to an event for latency of 10 ms, this is to suggest the guideline for the data size having the latency of 10 ms. Based on this value, the UPF 320 may measure the latency occurring for a specific data size.

(2-3) Average time window: This indicates the time window to be measured to check the traffic latency between the UE and the edge application server. For example, if the time window is 10 minutes, if measuring the latency between the UE and the edge application server, the UPF

320 may derive the traffic latency value as an average of values identified for 10 minutes.

In step 306, the UPF 320 may notify the event setting by transmitting a response for the procedure of step 305.

In step 307, the UPF 320 measures the traffic latency occurring for the corresponding UE or the corresponding DNN according to the event set in step 305 and its additional information. If the measured latency is greater than the set event value, the UPF 320 determines to transmit a report to the SMF 340.

In step 308, if latency of a value higher than the latency threshold has occurred according to step 307, the UPF 320 transmits its report to the SMF 340. This report may include the current latency value, and the number of the hops may be included according to the set event.

In step 309, the SMF 340 configures the report received from the UPF 320 as an event notification message, and forwards to the address of the local NEF 330 obtained in step 304 or the address of the local NEF 330 obtained in step 303a/303b. If a notification target address for the corresponding event is set, the SMF 340 forwards to the local NEF 330 by including this information. The event notification message of step 309 may be, for example, an Nsmf_EventExposure_Notify message.

In step 310, the local NEF 330 forwards the event report received from the SMF 340 in step 309 to the notification target address. The message of the event report of step 310 may be, for example, an Nnef_EventExposure_Notify message.

The AF 380 of the 3rd CSP receiving the event report of step 310 may determine that an adequate edge computing service may not be provided, because the latency exceeds the threshold. Alternatively, the AF 380 of the 3rd CSP may request the traffic steering from the 3GPP system to use a new routing path to reduce the latency again, or perform an application server relocation procedure to drive the edge application server closer to the UE, and to transmit the application traffic of the UE to the edge application server newly driven. Alternatively, if exceeding the set latency threshold, the AF 380 of the 3rd CSP may determine that an error has occurred in the provision of the edge computing service, and thus reduce charging to the application service provider, or record to reduce charging information to be paid by the 3rd CSP to the MNO.

Figure 4:
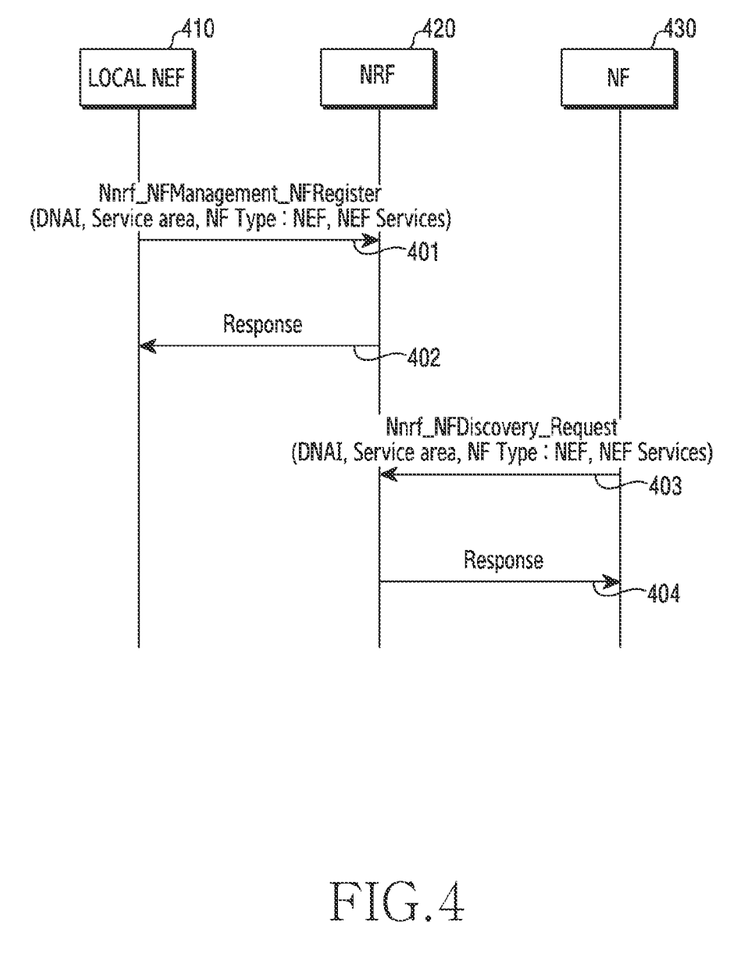
FIG. 4 illustrates a process of registering and discovering a local NEF in a wireless communication system according to various embodiments of the present disclosure.

FIG. 4 illustrates a process of registering and discovering a local NEF in a wireless communication system according to various embodiments of the present disclosure.

Specifically, FIG. 4 is a diagram illustrating a procedure for registering a local NEF 410 at an NRF 420 and a procedure for discovering the local NEF 410 through the NRF 420 according to various embodiments of the present disclosure.

FIG. 4 is the diagram illustrating the process for the local NEF 410 to register its location information or information for identifying its location at the NRF 420, and the procedure for another NF 430 to discover the local NEF 410 based on this information.

In step 401, the local NEF 410 may transmit to the NRF 420 an NF registration request message for registering a network service function (hereafter, referred to as NEF profile) provided by the local NEF 410. The NF registration request message may be, for example, an Nnrf_NFManagement_NFRegister message.

The NF registration request message may include profile information of the service supported by the local NEF 410.

The profile information includes at least one or more of an NF type indicating the local NEF 410, an NF instance ID, an NF service supported by the local NEF 410 (e.g., an event exposure service, a parameter provision service, a trigger service, a traffic influence service, an AF session service with QoS, etc.), a public land mobile network (PLMN) ID of the local NEF 410, a range of GPSIs supported by the local NEF 410, a range of external group identifiers, a single-network slice selection assistance information (S-NSSAI) supported by the local NEF 410 and its related network slice instance ID, an NF set ID, and an NF service set ID.

In addition, since the local NEF 410 is an NEF deployed to serve one or more edge computing environments or edge data networks, it includes information indicating a service area of the local NEF 410 in the profile. This information may be in the form of the DNAI for identifying the connection between the 3GPP system and the edge data network, and the 3GPP system may identify which edge data network or edge computing environment the local NEF is related to through the DNAI. Alternatively, the service area of the local NEF 410 may be represented as a tracking area ID, base station ID, or cell ID list, and such service area information may be also included in the profile. The profile information may include the DNN, and this DNN is information for identifying the edge data network, and may identify a local NEF which provides the service to a specific edge data network. Alternatively, an external service provider ID may be included in the profile information, which may be an ID for indicating a 3rd party service provider contracted for the local NEF to provide the service, for example, a 3rd party CSP or a 3rd party edge computing service provider. Thus, if the AF discovers the NEF or the NF discovers the NEF, the corresponding local NEF 410 may be discovered using the external service provider ID which is the ID of the third party service provider for using the NEF service.

In step 402, the NRF 420 receiving the NF registration request message of step 401 may store the received local NEF profile information, and mark that the local NEF 410 is an available NF. Next, the NRF may reply with an NF registration response message to the local NEF 410. The NF registration response message may include a registration result (result indication) of the profile information of the local NEF 410 which may indicate success or failure.

After receiving the registration request response message of step 402, the local NEF 410 may perform a procedure for updating the profile information to the NRF if the profile information is updated. The local NEF 410 may transfer the updated profile information to the NRF 420 through the Nnrf_NFManagement_NFUpdate procedure. For example, the profile registered in the NRF 420 may be updated through this procedure if the service area of the local NEF 410 is modified, if the external service provider ID for the local NEF 410 to provide the service is added/modified/removed, or if the service provided by the local NEF 410 is added/modified/removed.

In step 403 and step 404, the procedure for discovering and selecting the local NEF through the NRF 420 shall be described.

In step 403, the NF 430 may transmit an NF discovery request message for discovering a local NEF to the NRF 420. Herein, the NF 430 may be the NF or the AF of the 5G system, and may include the AF operated by the third party. The NF discovery request message may include information of a target NF to be discovered by the NF 430. According to this embodiment, the target NF indicates a local NEF. The NF discovery request message may be, for example, an Nnrf_NFDiscovery_Register message.

The target NF information may include at least one or more of an NF service name supported by the target NF, an NF type of the target NF, S-NSSAI supported by the target NF and its related NSI ID, DNN, PLMN ID of the target NF, a serving PLMN ID, an NRF in home PLMN (HPLMN) to discover the target NF, a location of the target NF, a range of GPSIs supported by the target NF or GPSI, a range of external group identifiers or an external group ID, an NF set ID, and an NF service set ID. In addition, the target NF information according to the present embodiment may include at least one or more of service area information supported by the target NF, the external service provider ID, and the DNAI.

In addition, the NF discovery request message of step 403 may include information (NF type, NF ID, etc.) of the NF 430.

The NRF 420 receiving the NF discovery request message in step 403 may authenticate whether the NF 430 may make the NF discovery request based on the received information (e.g., NF type, NF ID, or target NF information, etc.). For example, if local NEF discovery is requested as the NF type of the target NF, the NF type of the NF 430 is the AF, and if the NF ID includes the AF ID authorized by the MNO the authentication procedure may be performed.

If the authentication is successful, the NRF 420 may determine a set of NF instance(s) for satisfying a condition of the target NF included in the NF discovery request message received in step 403 based on the profile information of the NFs stored in step 401 and step 402. The NF instance set may include one or more NF instances. Various examples as follows may be possible in the method for the NRF 420 to select the local NEF in response to the NF discovery request of step 403. If the condition of the target NF to be discovered by the NF is a local NEF at a specific location (e.g., divided into the tracking area ID, the cell ID, the base station ID, etc.), the NRF 420 may select the local NEF instance which services the corresponding area. If the condition of the target NF to be discovered by the NF is a local NEF related to a specific DNAI, the NRF may select a local NEF supporting the corresponding DNAI in the profile of the local NEF. If the condition of the target NF to be discovered by the NF is a local NEF related to a specific external service provider ID, the NRF may select a local NEF which supports the corresponding external service provider ID in the profile of the local NEF. If the condition of the target NF is a local NEF supporting a specific NF service type (e.g., edge computing), the NRF may select a local NEF instance which supports the corresponding NF service type (e.g., edge computing service).

In step 404, the NRF 420 may reply with an NF discovery response message to the NF 430. The NF discovery response message may include profile information of the local NEF selected by the NRF in step 403. The local NEF profile information may include at least one or more of an NF type, an NF instance ID, a fully qualified domain name (FQDN) or an IP address of the NF instance, an NF service instance, an NF service name indicating each NF service instance, an FQDN or an IP address of each NF service instance, an NF load, S-NSSAI and its related network slice instance (NSI) ID, an NF location, an NF service area, an NF related DNAI, an external service provider ID serviced by the NF, an PLMN ID, an NF set ID, and an NF service set ID.

Based on the local NEF profile information received in step 404, if receiving two or more local NEF profile information, the NF 430 may select one local NEF instance among them. Alternatively, if one local NEF instance profile information is received, a corresponding local NEF instance may be selected. For example, the NF 430 may perform the operation of step 300 or step 304 in the embodiment of FIG. 3.

Next, the NF 430 may transmit a service request message to the selected local NEF, using the profile information (e.g., the FQDN or the IP address of the local NEF) of the selected local NEF. For example, step 300 may be performed in the embodiment of FIG. 3.

As an additional embodiment, the following illustrates the procedure for discovering and selecting a local NEF through a service communication proxy (SCP).

The NF 430 may transmit to the SCP a service request message (e.g., event exposure, parameter provisioning, traffic influence, AF session through QoS, etc). The service request message is a message to be transmitted to the local NEF 410, but the NF 430, which does not know the information of the local NEF 410, transmits the service request message to the SCP. The service request message may include target NF (e.g, local NEF) information and information (e.g., NF ID, NF type, etc.) of the NF 430 similar to the description in step 403.

The SCP receiving this may select a local NEF based on the received target NF information. The SCP may select a target NF based on configuration information of the SCP. Alternatively, the SCP may select the target NF by performing step 403 and step 404, that is, through the NRF 420. In this case, the SCP operates as the NF 430 of step 403 and step 404. If storing the received local NEF information and then selecting a similar target NF, the SCP receiving the target NF information (i.e., local NEF information) from the NRF 420 may select the local NEF, based on the stored information, that is, without communication with an additional NRF.

Next, the SCP may transfer a service request message to the selected target NF, for example, the local NEF. The local NEF may transmit a service response message to the SCP in response to the request. Next, the SCP may forward the service response message to the NF.

Figure 5:
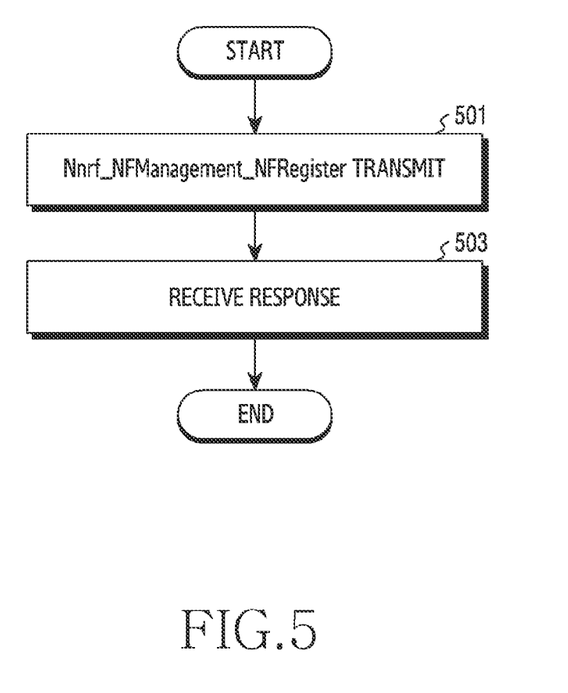
FIG. 5 is a flowchart illustrating an operation process of a first network node in a wireless communication system according to various embodiments of the present disclosure.

FIG. 5 is a flowchart illustrating an operation process of a first network node in a wireless communication system according to various embodiments of the present disclosure.

In the embodiment of FIG. 5, the first network node may be, for example, the local NEF 410 in the embodiment of FIG. 4.

In step 501, the first network node may transmit an NF registration request message for registering a network service function provided by a second network node to the second network node. Herein, the second network node may be, for example, the NRF 420 in the embodiment of FIG. 4. The NF registration request message may be, for example, an Nnrf_NFManagement_NFRegister message.

The NF registration request message may include profile information of a service supported by the first network node. The profile information may include at least one or more of an NF type indicating the first network node, an NF instance ID, an NF service supported by the first network node (e.g., an event exposure service, a parameter provision service, a trigger service, a traffic influence service, an AF session service with QoS, etc.), a PLMN ID of the first network node, a range of GPSIs supported by the first network node, a range of external group identifiers, an S-NSSAI supported by the first network node and its related network slice instance ID, an NF set ID, and an NF service set ID.

In step 502, the first network node receives an NF registration response message from the second network node. The second network node receiving the registration request message of step 501 may mark that the first network node is an available network node. In addition, the NF registration response message may include a registration result of the profile information of the first network node.

The methods according to the embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling an electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as internet, intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the present disclosure, the components included in the present disclosure are expressed in a singular or plural form. However, the singular or plural expression is appropriately selected according to a proposed situation for the convenience of explanation, the present disclosure is not limited to a single component or a plurality of components, the components expressed in the plural form may be configured as a single component, and the components expressed in the singular form may be configured as a plurality of components.

Meanwhile, while the specific embodiment has been described in the detailed explanations of the present disclosure, it will be noted that various changes may be made therein without departing from the scope of the present disclosure. Therefore, the scope of the present disclosure should not be limited to the described embodiments and should be defined by the claims described below as well as the claims and their equivalents.

INDUSTRIAL APPLICABILITY

The present disclosure relates generally to a wireless communication system, and more particularly, to an apparatus and a method for supporting an edge computing service in the wireless communication system.

The invention claimed is:

1. A method performed by a local network exposure function (NEF) entity in a mobile communication system, the method comprising:
transmitting, to a network repository function (NRF) entity, a network function (NF) registration request message including profile information on a service supported by the local NEF entity; and
receiving, from the NRF entity, an NF registration response message including a result indication indicating a success or a failure of a registration,
wherein the profile information includes at least one data network access identifier (DNAI) and at least one tracking area identity (TAI) for the local NEF entity,
wherein the at least one DNAI and the at least one TAI are for a discovery of the local NEF entity, and
wherein the at least one DNAI is used for an identification of an edge data network associated with the local NEF entity.

2. The method of claim 1, wherein the profile information further includes an NF type of the local NEF entity, an NF instance identifier of the local NEF entity, NF services supported by the local NEF entity, and a public land mobile network (PLMN) identifier.

3. The method of claim 1, wherein the profile information further includes at least one range of external group identifier.

4. The method of claim 3, wherein the local NEF entity is marked as available and the profile information is stored by the NRF entity.

5. A local network exposure function (NEF) entity in a mobile communication system, the NEF entity comprising:
a transceiver; and
a controller coupled with the transceiver, and configured to:
transmit, to a network repository function (NRF) entity, a network function (NF) registration request message including profile information on a service supported by the local NEF entity, and
receive, from the NRF entity, an NF registration response message including a result indication indicating a success or a failure of a registration,
wherein the profile information includes at least one data network access identifier (DNAI) and at least one tracking area identity (TAI) for the local NEF entity,
wherein the at least one DNAI and the at least one TAI are for a discovery of the local NEF entity, and
wherein the at least one DNAI is used for an identification of an edge data network associated with the local NEF entity.

6. The NEF entity of claim 5, wherein the profile information further includes an NF type of the local NEF entity, an NF instance identifier of the local NEF entity, NF services supported by the local NEF entity, and a public land mobile network (PLMN) identifier.

7. The NEF entity of claim 5, wherein the profile information further includes at least one range of external group identifier.

8. The NEF entity of claim 5, wherein the local NEF entity is marked as available and the profile information is stored by the NRF entity.

9. A method performed by a network repository function (NRF) entity in a mobile communication system, the method comprising:
receiving, from a network exposure function (NEF) entity, a network function (NF) registration request message including profile information on a service supported by the local NEF entity; and
transmitting, to the NEF entity, an NF registration response message including a result indication indicating a success or a failure of a registration, wherein the profile information includes at least one data network access identifier (DNAI) and at least one tracking area identity (TAI) for the local NEF entity,
wherein the at least one DNAI and the at least one TAI are for a discovery of the local NEF entity, and
wherein the at least one DNAI is used for an identification of an edge data network associated with the local NEF entity.

10. The method of claim 9, wherein the profile information further includes an NF type of the local NEF entity, an NF instance identifier of the local NEF entity, NF services supported by the local NEF entity, and a public land mobile network (PLMN) identifier.

11. The method of claim 9, wherein the profile information further includes at least one range of external group identifier.

12. The method of claim 9, further comprising:
marking the local NEF entity as available; and
storing the profile information.

13. A network repository function (NRF) entity in a mobile communication system, the NRF entity comprising:
a transceiver; and
a controller coupled with the transceiver, and configured to:
receive, from a network exposure function (NEF) entity, a network function (NF) registration request message including profile information on a service supported by the local NEF entity, and
transmit, to the NEF entity, an NF registration response message including a result indication indicating a success or a failure of a registration,
wherein the profile information includes at least one data network access identifier (DNAI) and at least one tracking area identity (TAI) for the local NEF entity,
wherein the at least one DNAI and the at least one TAI are for a discovery of the local NEF entity, and
wherein the at least one DNAI is used for an identification of an edge data network associated with the local NEF entity.

14. The NRF entity of claim 13, wherein the profile information further includes an NF type of the local NEF entity, an NF instance identifier of the local NEF entity, NF services supported by the local NEF entity, and a public land mobile network (PLMN) identifier.

15. The NRF entity of claim 13, wherein the profile information further includes at least one range of external group identifier.

16. The NRF entity of claim 13, wherein the controller is further configured to: mark the local NEF entity as available, and store the profile information.

* * * * *